3,326,937
BUTENOLIDES
Josef Fried, Chicago, Ill., and Eugene E. Galantay, Morristown, N.J., assignors, by mesne assignments, to E. R. Squibb & Sons, Inc., New York, N.Y., a corporation of Delaware
No Drawing. Filed Sept. 17, 1964, Ser. No. 397,300
5 Claims. (Cl. 260—343.6)

This invention relates to butenolides. More particularly, the invention relates to the butenolides represented by Formulas III, IV and V below.

According to this invention a compound of the formula (I)
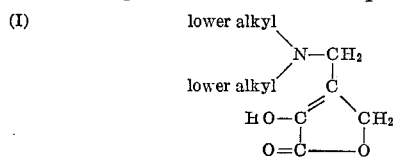

(which occurs in the form of the zwitterion) or its quarternary salt which has the formula (II)
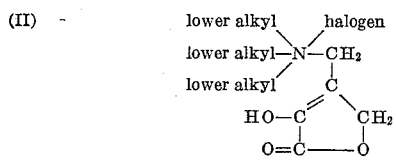

is converted by reaction with a substituted or unsubstituted triphenylmethyl mercaptan to the first compound of this invention which has the formula (III)
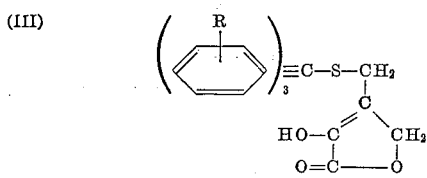

In Formula III R is hydrogen or halogen, preferably chlorine and bromine, so that unsubstituted phenyl and substituted phenyl groups such as o-, m-, and p- chlorophenyl, o-, m- and p- bromophenyl, and the like are included.

The triphenylmercaptomethyl-α-tetronic acid of Formula III may then be converted with an ammonium compound such as ammonium acetate, ammonium carbonate, ammonium chloride, ammonium propionate, etc., to the corresponding α-aminobutenolide of the formula (IV)
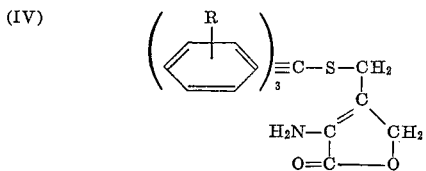

wherein R has the same meaning previously defined, which constitutes the second group of compounds of this invention.

The compounds of Formula IV in turn may be converted by reaction with a heavy metal salt to a metal salt complex of the formula (V)
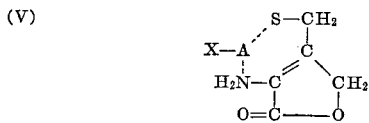

which constitutes the third group of compounds of this invention.

In the compounds of Formula V, A—X represents the metal salt portion of the butenolide complex wherein A is a divalent heavy metal such as mercury, lead and cadmium and X is an anion such as halide, especially chlorine and bromine, nitrate, sulfate and lower alkanoyloxy especially acetate.

The conversion of the compounds of Formulas I or II to the compound of Formula III is effected by reaction with triphenylmethyl mercaptan or a substituted trimethylphenyl mercaptan in an inert organic solvent such as dimethylformamide, N,N - dimethylacetamide, 1,2 - dimethoxyethane-(ethylene glycol dimethyl ether), 2-methoxy-ethyl ether (diethyleneglycol dimethyl ether), or the like, in the presence of a base such as alkali metal lower alkoxide, e.g., potassium t-butoxide, sodium ethoxide, an alkali metal hydride, e.g., sodium hydride, or sodamide, or the like, at about room temperature. The compound of Formula III formed in this manner is then converted to the product of Formula IV by the reaction of the triphenylmercaptomethyl-α-tetronic acid with an ammonium salt such as ammonium acetate at a temperature in the range of about 90° to 200°, preferably in an inert atmosphere such as nitrogen or dry ammonia.

The α-amino-β-triphenylmethyl mercaptomethyl-α,β-butenolide formed as a result of this reaction is converted into the final product of Formula V by reaction with a metal salt such as mercuric chloride, mercuric acetate or the like, in a solvent such as 1,2-dimethoxyethane (ethylene glycoldimethyl ether) or 2-methoxyethyl ether (diethylene glycol dimethyl ether), or the like, at ambient temperature.

The compounds of Formulas III and V are antibacterial agents useful to combat infections caused by the organism *Staphylococcus aureus,* including those strains resistant to penicillin G. They may be administered orally or parenterally in conventional pharmaceutical dosage forms such as tablets, capsules, injectables and the like or may be used topically in conventional vehicles such as creams, ointments and the like. They may also be used as disinfectants or sterilizing agents in conventional vehicles for this use. Compounds of Formulas III and IV, in addition, serve as intermediates in the preparation of the new compounds of Formula V.

The following examples are illustrative of the invention, all temperatures being expressed in degrees centigrade.

*Example 1.—β-Triphenylmethylmercaptomethyl-α-tetronic acid*

(A) In 7 ml. of a 0.36 N solution of potassium tert.-butoxide in dimethylformamide (2.60 mmoles of base) there is dissolved 391.8 mg. (1.99 mmoles) of β-dimethylaminomethyl-α-tetronic acid (zwitterion) and 557 mg. of triphenylmethylmercaptan (1.99 mmoles) and allowed to react at room temperature under a 30 mm. vacuum for 15 hours. After addition of 0.3 ml. of glacial acetic acid, the light yellow solution is evaporated (35°/1 mm.) and the residue extracted with 15 ml. of ethyl acetate.

(B) A solution of 2.55 g. of the crude mixture obtained by the procedure of Example 1, step A in methylene chloride is applied to a column of 108 g. of deactivated silica gel. First, 1.09 g. of triphenylmethyl mercaptan is eluted with methylene dichloride. Subsequent elution with methylene dichloride containing 5% ethyl acetate yields 577 mg. of β-triphenylmethylmercaptomethyl-α-tetronic acid which crystallizes on trituration with carbon tetrachloride, M.P., 145–157°.

*Example 2.—α-Amino-β-triphenylmethylmercaptomethyl-α,β-butenolide*

An intimate mixture of 1.482 g. (3.82 mmoles) of β-triphenylmercaptomethyl-α-tetronic acid and 0.591 g. (7.72 mmoles) of ammonium acetate is kept at 116° under nitrogen for 30 minutes. From the resulting brown oil, 1.482 g. of a gummy substance is extracted with chloroform. It is redissolved in methylene dichloride and chromatographed on a column made up from 100 g. 100/200 mesh Davison silica gel previously deactivated with 8 g. of water. Elution is continued with methylene dichloride. Besides triphenylmethylmercaptan and unchanged starting material, 580 mg. of the pure α-amino-β - triphenylmethylmercaptomethyl-α,β-butenolide is obtained which crystallizes on trituration with ether, M.P., 124–125°.

*Example 3.—α-Amino-β-mercaptomethyl-α,β-butenolide mercuric chloride complex*

To a solution of 126.7 mg. (0.326 mmole) of a α-amino-β-triphenylmethylmercaptomethyl-α,β - butenolide in 0.17 ml. of peroxide free 1,2-dimethoxyethane, there is added 0.46 ml. of a 1,2-dimethoxyethane solution of 90 mg. (0.331 mmole) of mercuric chloride. Immediately white crystals separate, which are washed on the centrifuge with small amounts of 1,2-dimethoxyethane to give 99.2 mg. (79.5%) of α-amino-β-mercaptomethyl-α,β-butenolide mercuric chloride complex.

*Example 4*

By substituting tri(p-chlorophenyl)methyl mercaptan for the triphenylmethyl mercaptan in Example 1 and otherwise following the procedure in that example, β-tri(p-chlorophenyl)methylmercaptomethyl - α - tetronic acid is obtained.

*Example 5*

By utilizing the product of Example 4 in the procedure of Example 2, α-amino-β-tri(p-chlorophenyl)methylmercaptomethyl-α,β-butenolide is obtained.

*Example 6*

By substituting lead (2) acetate for the mercuric chloride in the procedure of Example 3, α-amino-β-mercaptomethyl-α,β-mercaptomethyl-α,β-butenolide lead acetate complete is obtained.

*Example 7*

A suspension of 17 gms. of β-dimethylaminomethyl-α-tetronic acid and an excess of methyl iodide in dry acetone is kept at 0° to 6° for 20 hours with occasional shaking. The acetone is removed in vacuo leaving as residue β-dimethylamino-methyl-α-tetronic acid methiodide. This quaternary salt and a molar equivalent of tetraphenylmethylmercaptan are suspended in dimethylformamide, then stirred and heated on an oil bath (70°–110°) for one hour. Trimethyl ammonium iodide is separated by suction filtration and washed with methylene chloride. The washings and filtrate are combined and concentrated in vacuo at about 55°. The residual brown tar is taken up in a minimum volume of methylene chloride and applied to a column of deactivated silica gel (100 to 200 mesh, 100 g., deactivated with 8 gms. of water). The column is eluted continuously with methylene chloride, fractions of about 30 ml. being collected.

What is claimed is:
1. A compound of the formula

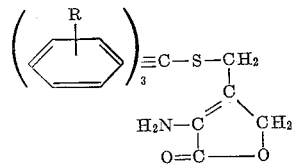

wherein R is a member of the group consisting of hydrogen and halogen,

2. α - Amino-β-tri(halophenyl)methylmercaptomethyl-α,β-butenolide.

3. α - Amino-β-tri(p - chlorophenyl)methylmercaptomethyl-α,β-butenolide.

4. α - Amino-β-triphenylmethylmercaptomethyl - α,β-butenolide.

5. A process for the production of a compound of claim 1 which comprises reacting a compound of the formula:

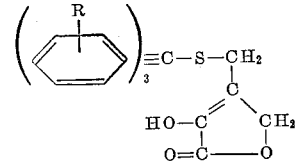

wherein R is a member of the group consisting of hydrogen and halogen, with an ammonium compound.

No references cited.

ALEX MAZEL, *Primary Examiner.*

JOSEPH A. NARCAVAGE, *Assistant Examiner.*